United States Patent Office 3,404,178
Patented Oct. 1, 1968

3,404,178
SUBSTITUTED METHYLENE DIPHOSPHONIC ACIDS AND THEIR SALTS
Clarence H. Roy, Oxford, Conn., assignor to The Procter & Gamble Company, Cincinnati, Ohio, a corporation of Ohio
No Drawing. Continuation-in-part of application Ser. No. 266,055, Mar. 18, 1963. This application Oct. 7, 1965, Ser. No. 493,925
1 Claim. (Cl. 260—502.4)

ABSTRACT OF THE DISCLOSURE

Benzyl and carboxymethyl substituted methylene diphosphonic acids and their water-soluble salts as novel compounds useful as detergency builder salts.

---

This patent application is a continuation-in-part of a copending application, Serial No. 266,055, filed March 18, 1963.

This invention relates to a novel class of compounds. More particularly, this invention relates to substituted methylene diphosphonic acid compounds and their water soluble salts, which possess valuable detergency builder properties with a broad range of detergent compounds. Novel laundering compositions whose cleaning powers are enhanced by these novel compounds are also described.

The use of builders are adjuncts to soap and synthetic detergents, and the property which some materials have of improving detergency levels of such detergent compounds is well known.

An ever increasing interest in builder materials because of their valuable properties in detergent formulations has resulted in the development of many candidates as builder materials. This increased interest has focused attention upon the ned for improved building and new chemical compounds which possess significant builder properties.

It is, therefore, a primary object of this invention to provide a novel class of substituted methylenediphosphonic acid compounds and their salts.

Still further objects and the entire scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent from this detailed description to those skilled in the art.

According to this invention, the new class of substituted methylenediphosphonic acid compounds has the following general formula:

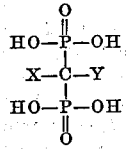

wherein X and Y are each selected from the group consisting of a benzyl radical, carboxymethylene radical, and hydrogen, at least one of X and Y being other than hydrogen.

Any alkali metal or ammonium or substituted ammonium (e.g. triethanol ammonium) salt form of the above novel acids can be prepared according to this invention. The alkali metal derivatives are the preferred compounds. Suitable alkali metals include sodium and potassium. The compounds herein are preferably obtained as the tetrasodium and trisodium salts as prepared according to this invention. The lesser neutralized forms such as monosodium and disodium derivatives or the free acid form are readily prepared also. They too have builder properties comparable to the trisodium and tetrasodium salt forms, provided, that additional alkali is added to adjust the pH of the washing solution to be within a range of from about 8 to about 12. The standard alkaline materials can be used for this purpose, such as alkali metal silicates, phosphates, borates and carbonates. Free alkali materials such as sodium and potassium hydroxides can be used also.

Specific illustrations of the newly discovered compounds include the following alkali metal derivatives. The trisodium salt is exemplified but, of course, other alkali metal and water soluble salts such as those mentioned above are within the scope of this invention.

(1) trisodium benzyl-methylenediphosphonate,
$C_6H_5CH_2CH(PO_3Na_2)(PO_3NaH)$

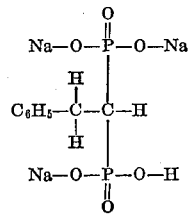

(2) trisodium bis(benzyl)-methylenediphosphonate,
$(C_6H_5CH_2)_2C(PO_3Na_2)(PO_3NaH)$

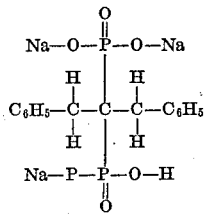

(3) tetrasodium-(carboxymethyl)-methylenediphosphonate, $NaO_2CCH_2CH(PO_3Na_2)(PO_3NaH)$

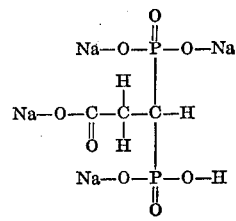

(4) pentasodium-bis(carboxymethyl) methylene diphosphonate, $(NaO_2CCH_2)_2C(PO_3Na_2)(PO_3NaH)$

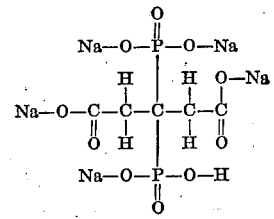

Compounds of the present invention constitute a previously unknown class of compounds. The members of this class have many uses besides the valuable builder applications described above. For instance, they can serve as valuable intermediates in the production of other compounds such as phosphine oxide derivatives which are known surface active materials. Moreover, phosphine oxides made from the compounds of this invention can be used as recovery agents for uranium.

The claimed diphosphonates have been found to be useful as sequestrants. This utility is indicated by the following table, wherein two representative members of the claimed class of compounds, trisodium benzyl methylenediphosphonate and tetrasodium-(carboxymethyl)-methylenediphosphonate, are compared to tetrasodium pyrosphate ($Na_4P_2O_7$) and sodium tripolyphosphate ($Na_5P_3O_{10}$). The testing was done using the method of Irani and Callis, The Journal of Physical Chemistry, vol. 64, 1398 (1960), with caprate substituted for oxylate in the nephelometric end point determination.

TABLE I

| Compound | T. (° C.) | G. Ca/100 g. salt (pH) | | |
|---|---|---|---|---|
| | | 10 | 11 | 12 |
| Tetrasodium pyrophosphate | 25 | 4.6 | 5.0 | 4.0 |
| Pentasodium tripolyphosphate | 25 | 8.1 | 7.9 | 6.6 |
| Trisodium benzylmethylenediphosphonate | 25 | 1.3 | 7.5 | 11.0 |
| Tetrasodium (carboxymethyl) methylenediphosphonate | 25 | 3.2 | 19.1 | 18.7 |

It will be noted that the performance of these members of the present invention is unexpectedly high at higher pH levels, e.g. 11 and 12. The values for tetrasodium-(carboxymethyl)-methylenediphosphonate in Table I are especially significant and noteworthy.

More especially, however, water soluble derivatives of the new compounds of this invention surprisingly have been discovered to be highly efficient detergency builders. They offer as an advantage over previously known builder compounds the possibility of using proportionally smaller amounts of builder compound without sacrificing over-all cleaning performance. Other similarly valuable advantages are discussed hereinafter.

Synthesis routes of these novel compounds essentially involve, as a first step, an oxidation-reduction type of a reaction between a metallating agent such as sodium, sodium hydride, potassium or potassium-sodium eutectic alloy, and a tetraalkyl ester of methylenediphosphonic acid. This reaction is highly exothermic and it is essential that it be conducted at low temperatures on the order of 0° C. to 35° C., and preferably between 15° C. and 30° C. The reaction product is a carbanion derived from the active methylene grouping present in the parent methylene ester starting material. The equation for this step is as follows:

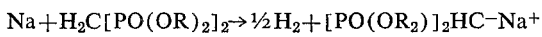

$$Na + H_2C[PO(OR)_2]_2 \rightarrow \tfrac{1}{2}H_2 + [PO(OR_2)]_2HC^-Na^+$$

This carbanion reaction product is then reacted with a suitable alkylating agent in order to obtain the desired substituted methylenediphosphonate tetraalkyl ester.

The phosphonate esters so derived can usually be purified by simple distillative means, if desired, after removal of by-product salts. More often, the crude product is converted directly to the free phosphonic acid by methods known to those skilled in the art, namely, by hydrolyzing with concentrated hydrochloric acid or in the case of isopropyl esters, by pyrolysis. An excellent novel pyrolytic process is described in a copending application Serial No. 218,863, filed August 23, 1962, by Clarence H. Roy and now abandoned. Addition of base such as sodium hydroxide and potassium hydroxide to the acids results in formation of the corresponding salts.

The tetraalkyl ester of methylenediphosphonic acid used as a starting material for preparing the novel compounds of this invention can be prepared according to the following method.

Preparation of tetraisopropyl methylenediphosphonate 624.7 gm. of triisopropyl phosphite (3 moles, 681 ml.) and 173.9 gm. of dibromomethane (1 mole, 70 ml.) were combined in a reaction apparatus composed of a 1-liter, 3-neck flask fitted with a magnetic stirrer, a thermometer, and a fractionating column for separating the isopropyl bromide by-product from the refluxing mixture. The fractionating column was constructed from a 36-inch Liebig condenser that had been modified to accommodate ¼-inch glass helices as packing. A Barrett distilling receiver, which had been modified by the addition of a thermometer well and thermometer was connected to the top of the fractionating column; and to the top of the Barrett receiver was fitted a Dewar condenser cooled with Dry Ice and protected from atmospheric moisture by a drying tube. The temperature of the reaction mixture was quickly brought to reflux at 143° C. The temperature of the circulating water in the packed reflux condenser was maintained at 65° C. This temperature was sufficient to return unreacted starting material and allow the by-product isopropyl bromide to be distilled. The heat input to the reaction was such that vigorous refluxing continued as the temperature of the mixture slowly increased. After about two hours of heating the first distillate was observed, and after five hours a total of 33 gm. of isopropyl bromide had been collected. The temperature of the reaction mixture was allowed to increase to 185° C. over a twelve hour period, and by means of an electronic temperature controller it was held there for the remainder of the reaction.

After approximately 16 hours, the reaction was essentially complete as judged by the yield of isopropyl bromide, 231 gm. which represented a yield of about 92%. Further heating served no useful purpose, although reaction times of 20 hours were employed on occasion.

When the reaction was complete, the reaction mixture was transferred to a distilling flask and the low boiling materials (excess phosphite, etc.) were removed through a short one-piece still under a vacuum of 0.1 mm. of mercury and head temperatures up to 50° C. At this point the contents of the flask weighed approximately 330 gm. and was 93% to 95% tetraisopropyl methylenediphosphonate. The purity of this material was sufficient to proceed in the synthesis of the novel compounds of this invention.

If a purer product is desired, a high capacity vacuum pump can be introduced into the system and the pressure reduced to 0.005 mm. of mercury. The material boiling between 80° C. and 116° C. is collected and redistilled through an electrically heated 24-inch Vigreux column. A complete example of this type of process is presented in a copending patent application, Serial No. 218,862, filed August 23, 1962, by Clarence H. Roy and now Patent No. 3,251,907.

In the preparation of the tetraalkyl ester reactant, particular care must be taken to insure that the starting materials are pure and freshly distilled because the presence of acidic residues in the product causes premature decomposition upon attempted distillation. If this occurs, the product must be neutralized at once, whereupon distillation may be resumed. The neutralization is time consuming and laborious, and is not recommended as an alternative to initial purification of reactants.

It should be noted that a product obtained by fractionation through a Vigreux column is very nearly as pure as that obtained by careful fractionation through a 24-inch spinning band column; also the yield is much improved because the faster through put reduces heating time and consequently, reduces the amount of undistillable resinous residues. The resinous residue in the flask should not be discarded, however, because hydrolysis of this material will yield methylenediphosphonic acid of remarkable purity.

The tetraalkyl methylenediphosphonate compound prepared according to the process just described or the process described in the copending application noted above can be used in this invention as illustrated in the following examples.

EXAMPLE I (A) Preparation of tetraisopropyl benzyl-methylenediphosphonate

Sodium, 16.09 gm. (0.7 mole), was dispersed in 150 ml. of boiling toluene contained in a one liter, three-neck flask which fitted with a thermometer, a 50 ml. offset, additive type separatory funnel, an Allihn condenser, and a high speed stirrer. The dispersion was cooled to 20° C. and 241.8 gm. (0.7 mole) tetraisopropyl methylenediphosphonate, of $CH_2[PO(OC_3H_7\text{-}i)_2]_2$, was added dropwise at a rate such that the reaction temperature could be controlled and maintained at 25° C.–30° C. by external cooling with a Dry Ice bath. When this reaction had reached completion, the reaction mixture was heated to 100° C. and benzyl bromide (0.7 mole, 120 gm.) was added dropwise to the stirred solution. The heat evolved by the reaction was sufficient to maintain the temperature of 100° C. for 20 minutes, after which the temperature began slowly dropping. A heating mantle was applied to the reaction flask and the temperature kept at 60° C. for one hour. The reaction mixture was then concentrated to a constant volume in vacuo; and the remaining material dissolved in 700 ml. of hexane and extracted with water until halide free. Reduction of the hexane solution to constant in vacuo volume gave 260 gm. of crude tetraisopropyl benzyl-methylenediphosphonate, $C_6H_5CH[PO(OC_3H_7\text{-}i)_2]_2$ yield 85.5%, $N_D^{25}$ 1.4742.

*Analysis.*—Calculated for $C_{20}H_{36}O_6P_2$: C, 55.29; H, 8.35; P, 15.26. Found: C, 56.48; H, 8.34; P, 14.41.

In addition to the monobenzyl compound, bis-benzyl and unreacted diphosphonate in about a one to one ratio were identified.

(B) Conversion to benzyl-methylenediphosphonic acid

A 72.6 gram (0.167 mole) sample of pure tetraisopropyl benzyl-methylenediphosphonate, $$C_6H_5CH_2CH[PO(OC_3H_7\text{-}i)_2]_2$$

was dissolved in 500 ml. of concentrated hydrochloric acid and refluxed for four hours. The reaction mixture was reduced to a constant volume on a flash evaporator and the last traces of water and HCl were removed by adding three portions of 2-propanol and reducing the volume after each addition. The crystalline mass which remained in the evaporating flask was filtered and washed with acetone, and dried in a vacuum desiccator over a mixture of silica gel and potassium hydroxide, leaving 43.7 gm. of benzyl-methylenediphosphonic acid, $$C_6H_5CH_2CH[PO(OH)_2]_2$$

M.P. 210° C.–212° C., yield 98.2%.

*Analysis.*—Calculated for $C_8H_{12}O_6P_2$: C, 36.11, H, 4.55, P, 23.28. Found: C, 36.20; H, 4.66; P, 23.5.

EXAMPLE II (A) Preparation of tetraisopropyl 2-carbethoxy-ethylidenediphosphonate A sodium dispersion was prepared by dispersing 22.99 grams (1 mole) of sodium in boiling toluene contained in a one liter, three neck flask fitted with a thermometer, a high speed stirrer, a 50 ml. offset additive type separatory funnel, and an Allihn condenser. A Dry Ice bath was employed to maintain the temperatures in the desired range during the reaction. After the dispersion was cooled to 25° C., 344.33 grams (1 mole) of tetraisopropyl methylenediphosphonate $CH_2[PO(OC_3H_7\text{-}i)_2]_2$, was added dropwise to the reaction vessel over a 45 minute period, keeping the reaction temperature at 20° C.–30° C. by partial immersion of the reaction flask in the Dry Ice bath. The reaction reached completion ten minutes after all of the starting ester had been added. One mole (122.55 gm.) of ethyl chloroacetate ($C_3H_5OCOCH_2Cl$) was then added dropwise to the solution over a 30 minute period, again controlling the exothermic reaction with the Dry Ice bath. Following addition of all the ethyl chloroacetate, the mixture was heated to 60° C. for one hour. The solvent was then removed under vacuum and the residue dissolved in 600 ml. of hexane and extracted with water until the water extract was halide free. The hexane solution was dried with anhydrous $MgSO_4$, concentrated, and then distilled to give 86 grams of the tetraisopropyl 2-carbethoxy-ethylidenediphosphonate, $$C_2H_5OCOCH_2CH[PO(OC_3H_7\text{-}i)_2]_2,$$

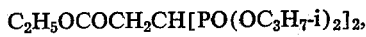

$N_D^{25}$ 1.4388, yield 20%.

*Analysis.*—Calculated for $C_{17}H_{36}O_8P_2$: C, 47.4; H, 8.4; P, 14.4. Found: C, 47.2; H, 8.7; P, 14.0.

In addition to the mono-carboxy compound, bis-carboxy and unreacted disphosphonate in about a one to one ratio were identified.

(B) Conversion to (carboxymethyl)-methylenediphosphonic acid

A 43 gram sample (0.1 mole) of tetraisopropyl 2-carbethoxyethylidenediphosphonate, $$C_2H_5OCH_2CH[PO(OC_3H_7\text{-}i)_2]_2$$

was dissolved in 250 ml. of concentrated hydrochloric acid and refluxed for four hours. The resulting solution was then concentrated to a constant volume on a flash evaporator. Traces of water and HCl were removed by adding two 100 ml. portions of 2-propanol and concentrated after each addition. A total of 23.1 grams (98.4% yield) of colorless, glassy material which had the theoretically correct $P^{31}$ and proton nuclear magnetic resonance spectra for (carboxymethyl)-methylenediphosphonic acid was obtained; but standing in a vacuum desiccator did not produce a crystalline product.

*Analysis.*—Calculated for $C_3H_8O_8P_2$: C, 15.4; H, 3.5; P, 26.5. Found: C, 15.8; H, 3.8; P, 26.3.

Each of the acids prepared above are very easily converted to a salt form by reacting with a base such as sodium hydroxide. The resulting compounds perform as excellent detergency builder materials as mentioned previously and also as exemplified hereinafter.

Valuable detergent compositions can consist essentially of a detergent compound and, as a builder, a water soluble salt of one of the new compounds identified above, the ratio by weight of the builder to the detergent compound being in the range of about 1:3 to about 10:1 said composition providing in aqueous solution a pH of between about 8 to about 12. The preferred ratio of builder to said detergent surfactant compound is in the range of about 1:2 to about 5:1 and the optimum pH range is between 9.5 to 11.5.

Among the organic detergent surfactant compounds which can be successfully built by compounds prepared according to this invention are anionic, nonionic, ampholytic and zwitterionic detergent surfactants, and mixtures thereof.

The anionic, nonionic, ampholytic and zwitterionic detergent can be used singly or in combination in the practice of the present invention.

The foregoing organic synthetic detergent compounds and the novel builder compounds of this invention can be formulated according to any of the several commercially desirable composition forms, for example, granular, flake, liquid and tablet form.

The usefulness of the compounds described herein as builders can be seen from the following evaluations in which soiled fabrics were washed with detergent compositions consisting solely of a detergent and a builder.

New cotton cloth was desized, then extracted with the chloroform-methanol azeotrope. The cloth was then cut into strips five by fifteen inches, and two such strips were affixed to the inside of a T-shirt which was then worn by a subject for two days. The soiled strips were then cut into 2½ inch square swatches and randomly mixed. The swatches were then washed in hard water (seven grains/ U.S. gal.) with 0.03% detergent concentration. Two evaluations with different detergents were run using sodium tetrapropylene benzene sulfonate (ABS) at 140° F., and 3-(dimethyl hexadecyl ammonio) propane-1-sulfonate ($C_{16}$ APS) at 80° F. The representative members of the new compounds described herein were evaluated as builders; namely, trisodium benzyl-methylene diphosphonate and tetrasodium-(carboxymethyl)-methylenediphosphonate. Comparisons were made to the widely used commercial builder, sodium tripolyphosphate (STP). After being washed in an agitator-type washing machine for ten minutes, the swatches were rinsed twice for two minutes, dried, and extracted once again with the chloroform-methanol azeotrope. The lipid extracted was compared to that in control swatches in terms of Percent Lipid Soil Removed. The results are summarized in Table II.

TABLE II

| Builder concentration in the wash solution | Percent lipid removal | |
|---|---|---|
| | ABS (pH=10) | $C_{16}$APS (pH=11) |
| Trisodium benzyl-methylene diphosphonate (0.03%) | 48.9 | 62.5 |
| Tetrasodium-(carboxymethyl)-methylenediphosphonate (0.03%) | 62.4 | 68.6 |
| Sodium tripolyphosphate (0.06%) | 64.0 | |

It is noted that the compounds of the present invention are on a par with the recognized standard builder. It is also to be noted that their performance can be favorably compared to a standard builder (STP) at twice their concentration.

The foregoing description of the invention has been presented describing certain operable and preferred embodiments. It is not intended that the invention should be so limited since variations and modifications thereof will be obvious to those skilled in the art, all of which are within the spirit and scope of this invention.

What is claimed is:
1. An alkali metal salt of bis-(benzyl) methylenediphosphonic acid.

References Cited
UNITED STATES PATENTS

| | | | |
|---|---|---|---|
| 2,765,279 | 10/1956 | Nusslein | 260—500 |
| 3,093,672 | 6/1963 | Miller | 260—932 |
| 3,159,581 | 12/1964 | Diehl | 260—500 |
| 3,214,454 | 10/1965 | Blaser et al. | 260—500 |
| 3,256,370 | 6/1966 | Fitch et al. | 260—500 |

FOREIGN PATENTS
889,670  2/1962  Great Britain.

OTHER REFERENCES
Freedman et al., "Chem. Rev.," vol. 57 (1957), p. 513.
Pudovik, "Chem. Abstr.," vol. 47, (1953), col. 10467.

BERNARD HELFIN, *Primary Examiner.*

J. E. EVANS, *Assistant Examiner.*